US006568874B1

(12) United States Patent
Sommerfeld et al.

(10) Patent No.: US 6,568,874 B1
(45) Date of Patent: May 27, 2003

(54) PIVOT JOINT

(75) Inventors: Dean R. Sommerfeld, Iola, WI (US); Scott G. Williamson, Stevens Point, WI (US)

(73) Assignee: Sunrise Medical HHG. Inc., Longmont, CO (US)

( * ) Notice: Subject to any disclaimer, the term of this patent is extended or adjusted under 35 U.S.C. 154(b) by 0 days.

(21) Appl. No.: 09/594,114

(22) Filed: Jun. 14, 2000

(51) Int. Cl.[7] .............................. B25G 3/18; F16B 21/00
(52) U.S. Cl. ........................ 403/321; 403/65; 403/400; 403/398
(58) Field of Search .............................. 403/65, 70, 71, 403/68, 119, 398, 400, 321

(56) References Cited

U.S. PATENT DOCUMENTS

| | | | | |
|---|---|---|---|---|
| 2,640,672 A | * | 6/1953 | Bedford, Jr. | |
| 3,521,842 A | * | 7/1970 | Oppererthauser | ........... 248/302 |
| 4,089,087 A | * | 5/1978 | Heitman | ....................... 24/329 |
| 4,779,885 A | * | 10/1988 | Zinn | |
| 4,892,354 A | * | 1/1990 | Estkowski et al. | |
| 5,118,215 A | * | 6/1992 | Freier | |
| 5,221,154 A | * | 6/1993 | Foulquier et al. | |
| 5,294,156 A | * | 3/1994 | Kumazaki et al. | ........ 285/124.2 |
| 5,490,693 A | * | 2/1996 | Fisher et al. | ................. 285/420 |
| 5,507,529 A | * | 4/1996 | Martins | .................... 285/124.2 |
| 6,135,476 A | * | 10/2000 | Dickie et al. | |

* cited by examiner

Primary Examiner—Lynne H. Browne
Assistant Examiner—Aaron Dunwoody
(74) Attorney, Agent, or Firm—MacMillan, Sobanski & Todd, LLC

(57) ABSTRACT

A pivot joint comprises a receiver supported relative to a first member. The receiver is provided for receiving a second member. The receiver is partially cylindrical. A retainer is adapted to be supported relative to the first member to trap the second member in the receiver. The retainer has an arcuate shaped portion that is adapted to engage the second member. Moreover, the retainer has a resilient portion that is adapted to conform to a portion of the second member.

11 Claims, 4 Drawing Sheets

PIVOT JOINT

BACKGROUND OF THE INVENTION

This invention relates in general to couplings and more particularly, to a pivot joint. Most particularly, the invention relates to a pivot joint for supporting a pivotal member relative to a stationary member.

Conventional pivot joints include a bearing supported on the end of a pivotal shaft. The bearing is supported in a hole in a stationary member. This type of pivotal joint is not suitable for use with a pivotal member in the form of a closed loop.

A conventional bearing is not really suitable for a closed loop pivotal member because the bearing must be applied to the pivotal member prior to forming the closed loop. The closed loop would more commonly be formed prior to applying a finish to the pivotal member. If a conventional bearing is applied prior to finishing or painting the pivotal member, the bearing itself would be painted, thus interfering with paint covering the pivotal member.

Some bearings may be applied to a pivotal member after the pivotal member is formed and painted. For example, a pillow block bearing is a bearing that may be separated in halves to receive a pivotal member and joined back together. Such a bearing assembly may be suitably applied to a pivotal member after the pivotal member is formed. However, such bearings are commonly bolted to a stationary member.

A flexible, compliant pivot joint is needed that permits expedient assembly of pivotal and stationary members and which accommodates manufacturing intolerance to provide a tight fit, free of play.

SUMMARY OF THE INVENTION

The present invention is directed towards a pivot joint that meets the foregoing needs. The pivot joint comprises a receiver supported relative to a first member. The receiver is provided for receiving a second member. The receiver is partially cylindrical. A retainer is adapted to be supported relative to the first member to trap the second member in the receiver. The retainer has an arcuate shaped portion that is adapted to engage the second member. Moreover, the retainer has a resilient portion that is adapted to conform to a portion of the second member.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
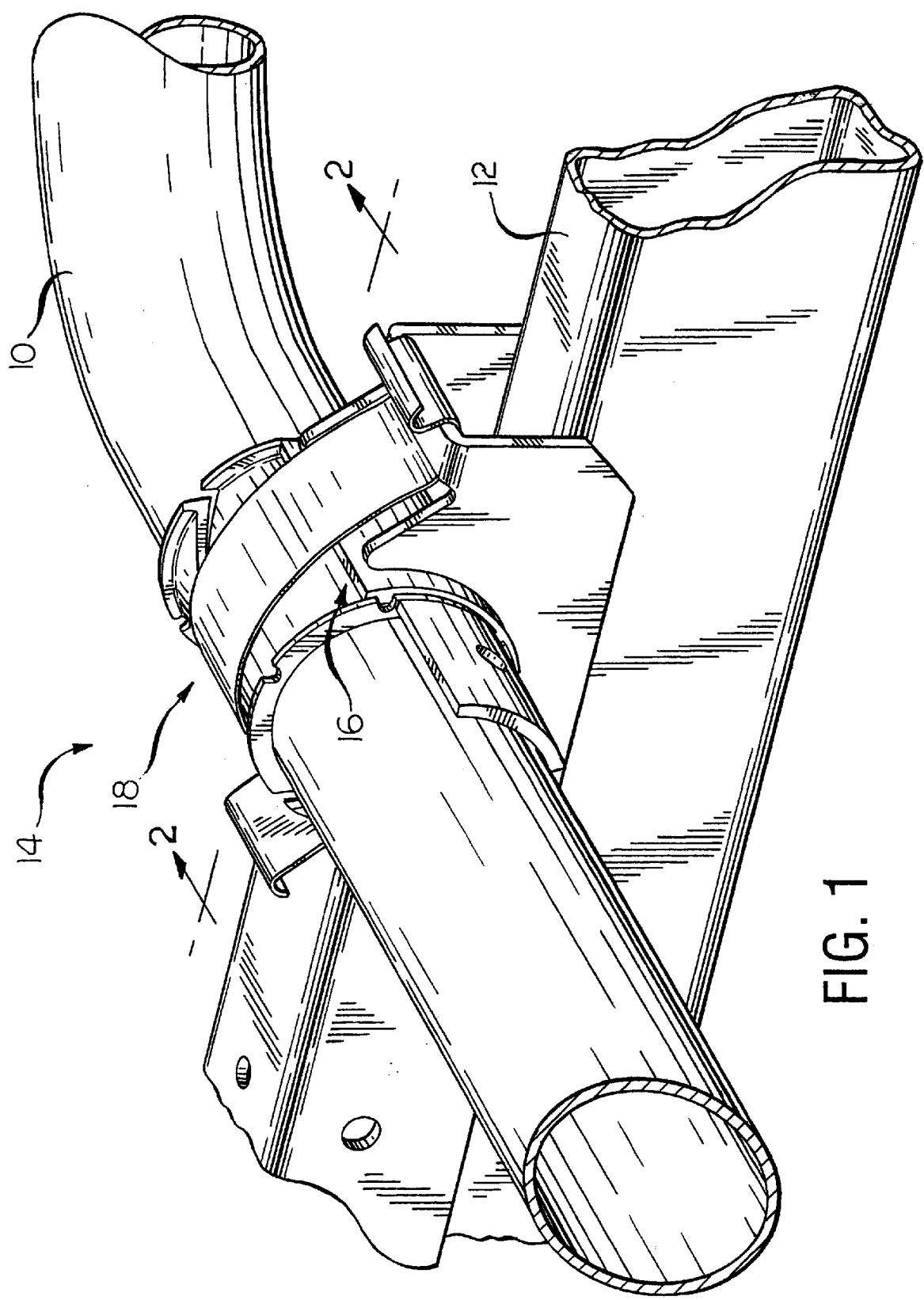
FIG. 1 is a perspective view of a pivot joint according to the invention supporting a pivotal member relative to a stationary member.

Referring now to the drawings, there is illustrated in FIG. 1 a first member 10 which is in the form of an articulated bed sleep surface section or a wheelchair seat frame. The first member 10 is coupled to a second member 12 so that the first member 10 may be displaced relative to the second member 12. The second member 12 is in the form of a substantially stationary member, such as the main frame of an articulated bed or the base frame of a wheelchair.

The present invention is a pivot joint 14 for movably coupling the first and second members 10, 12 together. In accordance with the preferred embodiment of the invention, the pivot joint 14 is comprised of a receiver 16 and a retainer or keeper 18. The receiver 16 may be in the form of a cradle or a cup which is adapted to be fixed relative to one of the members 10, 12. As shown in the drawings, the receiver 16 is fixed relative to the first member 10 but it is conceivable that it may be fixed relative to the second member 12.

The receiver 16 is preferably cylindrical in shape and adapted to receive a tube, such as a tubular portion or segment of an articulated bed sleep surface section or a wheelchair seat frame. The retainer 18 is adapted to be attached relative to the receiver 16 so as to trap the second member 12 in the receiver 16.

Figure 2:
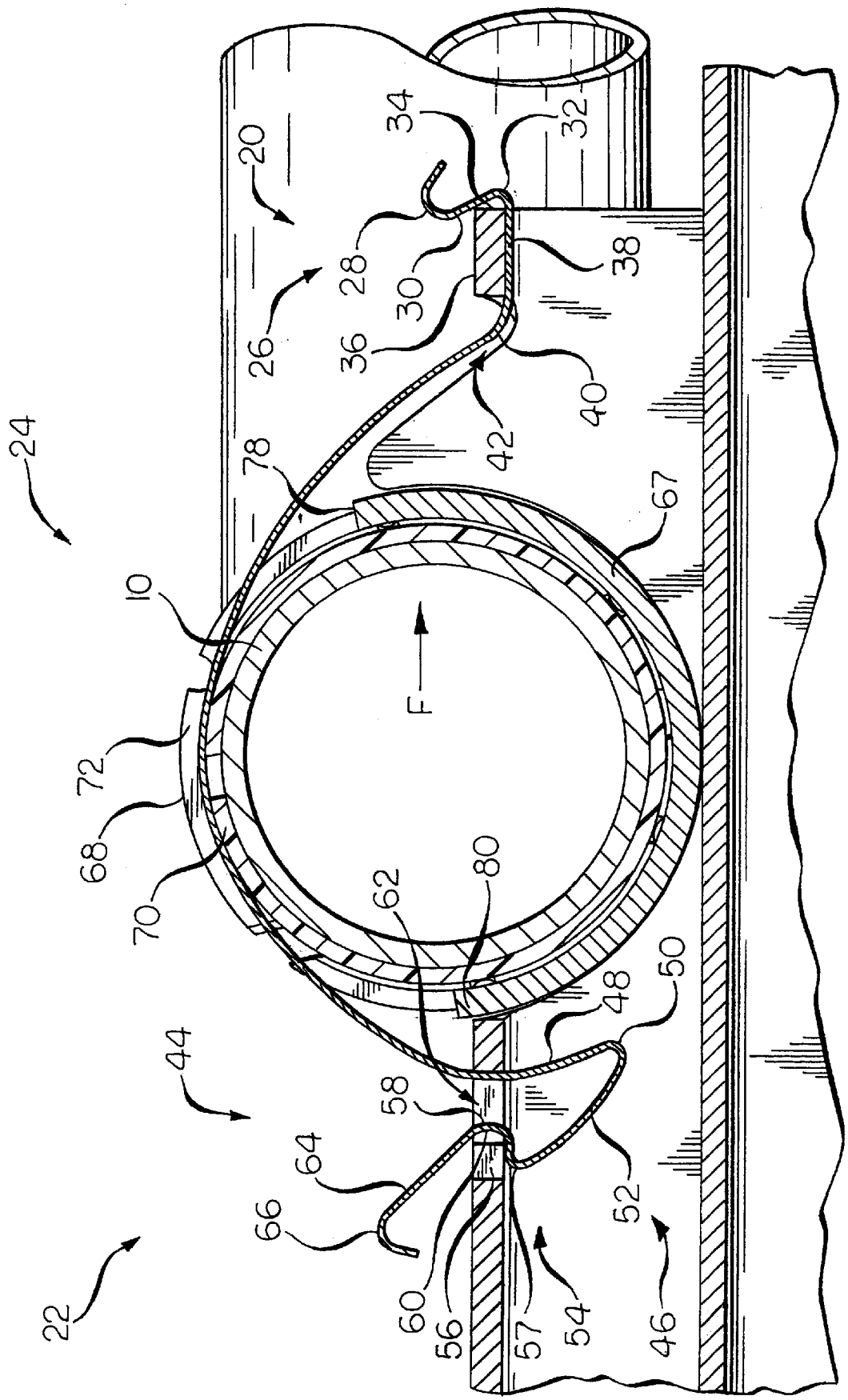
FIG. 2 is an enlarged cross-sectional view of the pivot joint taken along the line 2—2 in FIG. 1.

In the preferred embodiment of the invention, the retainer 18 includes a first portion 20 and a second portion 22 joined in a spaced relation to one another by an intermediate portion 24, as shown in FIG. 2. The first portion 20 is defined at least in part by a hook end 26. The hook end 26 may include a first bent portion 28 at its terminal end. The first bent portion 28 defines an inverted U-shaped member. The inverted U-shaped member forms a blunt tip for the hook end 26.

The first bent portion 28 is joined in a spaced relation to a second bent portion 32 by a downwardly extending portion 30. The second bent portion 32 defines a region that is adapted to engage a laterally extending edge 34 of a substantially horizontal member 36, the substantially horizontal member 36 being substantially fixed relative to the receiver 16. A substantially horizontally extending portion 38 of the hook end 26 is adapted to extend below the substantially horizontal member 36 from the second bent portion 32 to a third bent portion 40 of the hook end 26.

The third bent portion 40 extends upwardly through a first opening 42 in the second member 12 and joins the intermediate portion 24 of the retainer 18. The intermediate portion 24 is arcuate in shape and is adapted to flex about the first member 10 supported by the receiver 16 to hold the first member 10 firmly in the receiver 16.

An opposing end of the intermediate portion 24 terminates in the second portion 22 of the retainer 18. The second portion 22 is defined at least in part by a latch end 44. In the preferred embodiment of the invention, the latch end 44 is in the form of an interference member 46 having a first engaging portion 48 extending from the intermediate portion 24. The first engaging portion 48 terminates in a first bent portion 50, which in turn joins a slightly bowed intermediate portion 52.

A substantially S-shaped portion 54 is held in a spaced relation to the first bent portion 50 by the slightly bowed intermediate portion 52. The S-shaped portion 54 is defined by second and third bent portions 56, 58 of the second portion 22. The second bent portion 56 defines an outer cam surface 57 and is adapted to flex at least slightly, as is the first engaging portion 48 and the slightly bowed intermediate portion 52. The third bent portion 58 defines a second engaging portion 60. The interference member 46 is adapted to be received in a second opening 62 in the second member 12.

The second opening 62 is preferably in the form of a laterally extending slot defined in part by opposing laterally extending edges. The first and second engaging portions 48, 60 are adapted to engage the opposing laterally extending edges. Upon inserting the interference member 46 in the second opening 62, the first bent portion 50 enters the second opening 62. The slightly bowed intermediate portion 52 engages and travels downwardly along a first lateral edge of the second opening 62. The first engaging portion 48 travels downwardly along a second lateral edge. When the outer cam surface 57 engages the second lateral edge, the slightly bowed intermediate portion 52 flexes to enable the outer cam surface 57 to pass between the opposing laterally extending edges with relative ease. When the outer cam surface 57 overcomes the second lateral edge, the slightly bowed intermediate portion 52 flexes back in an opposing direction and the second lateral edge snaps into the third bent portion 58 of the S-shaped portion 54. The first engaging portion 48, the slightly bowed intermediate portion 52, and the first bent portion 50 all flex at least slightly to resist displacement of the interference member 46 from the second opening 62.

The latch end 44 of the retainer 18 further includes a substantially straight portion 64 extending from the third bent portion 58 of the second portion 22. The substantially straight portion 64 is provided to assist in handling and controlling the retainer 18 and displacing the interference member 46 in the second opening 62 in the second member 12. In the preferred embodiment of the invention, the retainer 18 is adapted to be pivotally displaced relative to the second member 12 about the hook end 26 to engage the interference member 46 in the second opening 62. A sufficient downward force applied against the substantially straight portion 64 urges the interference member 46 into and through the second opening 62. A sufficient upward force applied against the substantially straight portion 64 can displace the interference member 46 upwardly out of the second opening 62.

A fourth bent portion 66 may be provided at a terminal end of the substantially straight portion 64. The fourth bent portion 66 is preferably in the form of an inverted U-shaped member, which provides a blunt tip for the latch end 44.

In the preferred embodiment of the invention, the receiver 16 includes a substantially semi-cylindrical sleeve 67 supported by the second member 12. The substantially semi-cylindrical sleeve 67 is preferably adapted to receive a bushing, such as the split bushing 68 shown. The split bushing 68 is adapted to be spread open to receive the second member 12. The use of the split bushing 68 will reduce the risk of the second member 12 wearing.

In the preferred embodiment of the invention, the split bushing 68 is defined by a substantially cylindrical sleeve 70 having a circumferential slit about a portion of its circumference. Radially extending flanges 72 are provided at opposing ends of the substantially cylindrical sleeve 70. The substantially semi-cylindrical sleeve 67 is adapted to receive the substantially cylindrical sleeve 70 with the radially extending flanges 72 being disposed at opposing lateral ends of the substantially semi-cylindrical sleeve 67. The radially extending flanges 72 are provided to resist axial displacement of the split bushing 68 relative to the receiver 16. It may be necessary to provide circumferentially spaced notches in the radially extending flanges 72 to permit the split bushing 68 to be spread open.

Figure 3:
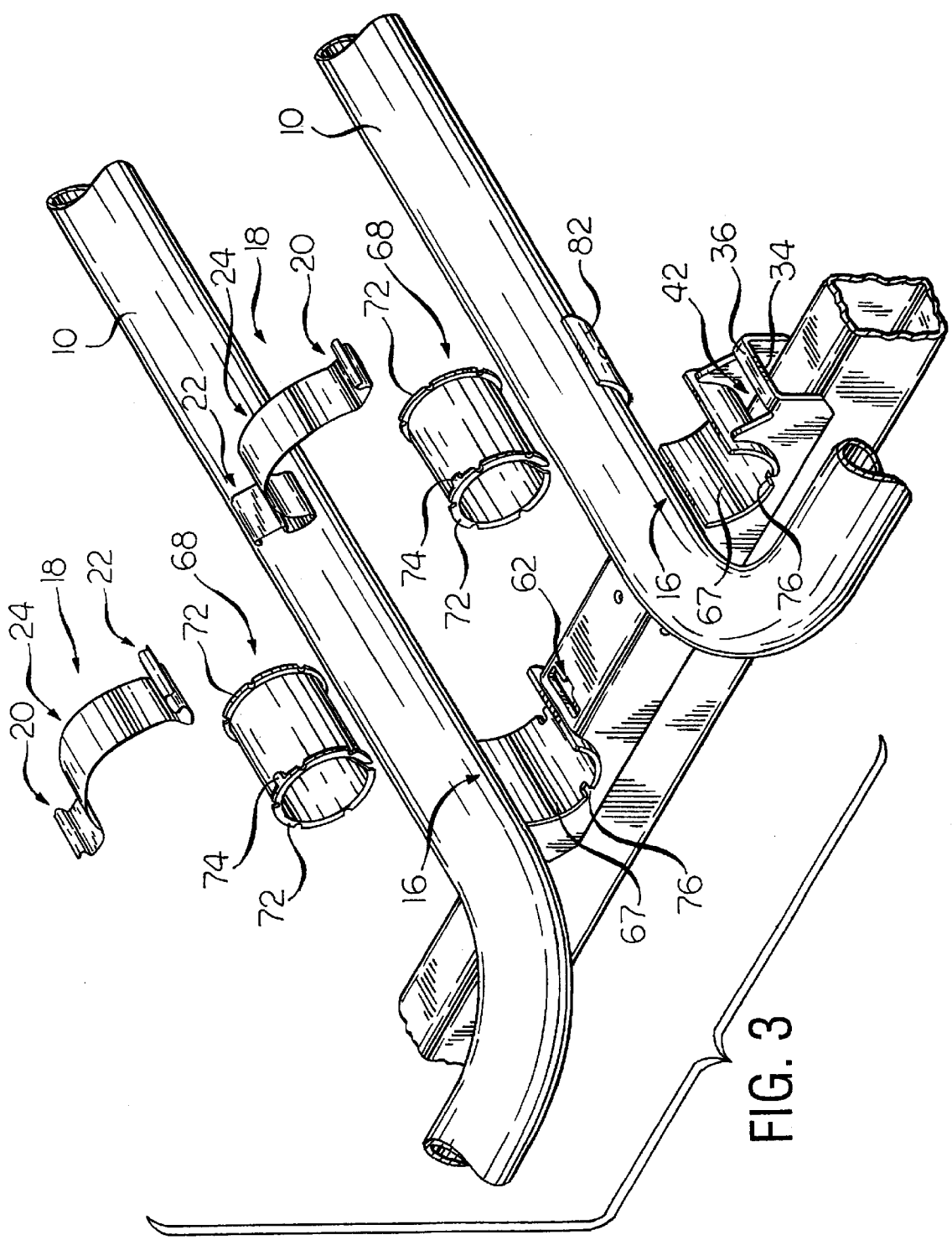
FIG. 3 is an exploded perspective view of a pair of pivot joints supporting a pair of pivotal members relative to a stationary member.

To resist rotational displacement of the split bushing 68 relative to the receiver 16, the split bushing 68 and the receiver 16 may be keyed relative to one another. For example, as shown in FIG. 3, the split bushing 68 may be provided with one or more keys, such as the tabs or protrusions 74 shown. The receiver 16 may be provided with one or more slots 76 that are adapted to receive respective protrusions 74. With the protrusions 74 engaging the slots 76 and the retainer 18 fixed relative to the receiver 16, the split bushing 68 is not inclined to slip or rotate relative to the receiver 16.

In the preferred embodiment, the substantially semi-cylindrical sleeve 67 is preferably fixed relative to the receiver 16 at an angle of inclination so as to produce an elevated cylindrical wall portion 78 and a depressed cylindrical wall portion 80, as shown in FIG. 2. The first member 10 is adapted to rotate relative to the split bushing 68 and the substantially semi-cylindrical sleeve 67. This rotation may be effected by an actuator (not shown) coupled to the first member 10. The elevated cylindrical wall portion 78 is provided to reduce the risk of the first member 10 being dislodged from the substantially semi-cylindrical sleeve 67 by the force of the actuator in the direction of arrow F.

Figure 4:
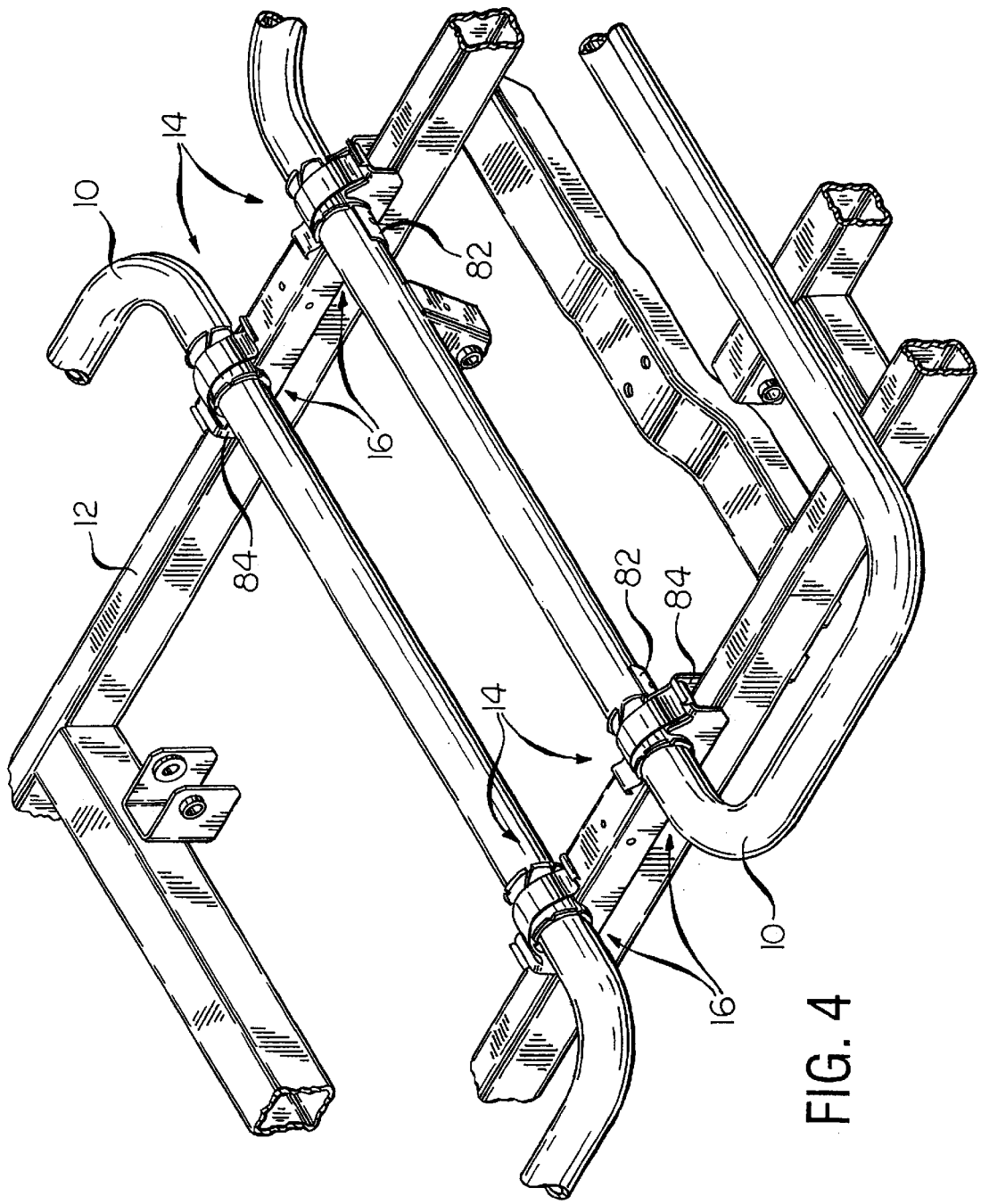
FIG. 4 is a perspective view of laterally spaced pivot joints according to the invention supporting a pair of pivotal members relative to a stationary member.

The preferred embodiment of the invention further includes a stop 82 which is fixed relative to the first member 10, as shown in FIG. 3, to prevent the first member 10 from moving laterally or axially relative to the receiver 16. As shown in FIG. 4, a single first member 10 may be supported by two laterally spaced pivot joints 14. A pair of laterally spaced stops 82 cooperates to resist lateral or axial movement in both directions along the lateral axis of the first member 10.

It should be understood that the receiver 16 need not be integral with the second member 12. As shown in FIG. 4, the receiver 16 may be an integral part of a bracket, such as the elongate bracket 84 shown, and the first and second openings 42, 62 (shown in FIGS. 2 and 3) may be defined by the elongate bracket 84. In this way, the first and second openings 42, 62 are provided in a fixed location relative to the elongate bracket 84. The elongate bracket 84 may in turn be attached to the second member 12, thus fixing the receiver 16 and the first and second openings 42, 62 in a substantially fixed location relative to the second member 12. The elongate bracket 84 shown is adapted to accommodate a plurality of receivers 16. Other brackets may be suitable for carrying out the invention, such as a bracket for supporting a single receiver 16.

It should further be understood that the pivot joint is flexible and compliant. It permits expedient assembly of pivotal and stationary members. The flexible character accommodates manufacturing intolerance and provides a tight fit, free of play.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A pivot joint for supporting a first member relative to a second member, said pivot joint comprising:
   a receiver for receiving the first member, said receiver being supported relative to the second member, said receiver being at least partially cylindrical; and
   a retainer adapted to be supported relative to the second member to trap the first member in said receiver, said retainer having an arcuate shaped portion that is adapted to engage the first member, said retainer having a resilient portion that is adapted to conform to a portion of the first member, said receiver including a substantially semi-cylindrical sleeve supported by the second member, said substantially semi-cylindrical sleeve being at an angle of inclination so as to produce an elevated cylindrical wall portion and a depressed cylindrical wall portion, said first member being adapted to rotate relative to said substantially semi-cylindrical sleeve.

2. A pivot joint according to claim 1, wherein said intermediate portion is arcuate in shape and adapted to flex about the first member to hold the first member firmly in said receiver.

3. A pivot joint according to claim 1, wherein said latch end is in the form of an interference member.

4. A pivot joint according to claim 3, wherein said interference member has a first engaging portion, a second engaging portion, and a slightly bowed portion intermediate said first and second engaging portions, said slightly bowed portion being adapted to flex at least slightly, said interference member being adapted to be received in an opening located in a fixed position relative to said receiver.

5. A pivot joint according to claim 1, wherein said receiver receives a bushing, said bushing being adapted to receive the first member.

6. A pivot joint according to claim 5, wherein said bushing includes a split and is adapted to be spread open to receive the first member.

7. A pivot joint for supporting a first member relative to a second member, said pivot joint comprising:

a receiver for receiving the first member, said receiver being supported relative to the second member, said receiver being at least partially cylindrical; and a retainer adapted to be supported relative to the second member to trap the first member in said receiver, said retainer having an arcuate shaped portion that is adapted to engage the first member, said retainer having a resilient portion that is adapted to conform to a portion of the first member, said receiver is adapted to receive a bushing, said bushing being adapted to receive the first member, said bushing including a substantially cylindrical sleeve and radially extending flanges at opposing ends of said substantially cylindrical sleeve, said receiver being adapted to receive said substantially cylindrical sleeve with said radially extending flanges being disposed at opposing lateral ends of said substantially cylindrical sleeve.

8. A pivot joint according to claim 7, wherein said bushing is provided with one or more protrusions and said receiver is provided with one or more slots that are adapted to receive respective protrusions.

9. A pivot joint for supporting a first member relative to a second member, said pivot joint comprising:

a receiver for receiving the first member, said receiver being supported relative to the second member, said receiver being at least partially cylindrical; and a retainer adapted to be supported relative to the second member to trap the first member in said receiver, said retainer having an arcuate shaped portion that is adapted to engage the first member, said retainer having a resilient portion that is adapted to conform to a portion of the first member, said receiver being adapted to receive a bushing, said bushing being adapted to receive the first member, said bushing and said receiver being keyed relative to one another.

10. A pivot joint for supporting a first member relative to a second member, said pivot joint comprising:

a receiver for receiving the first member, said receiver being supported relative to the second member, said receiver being at least partially cylindrical;

a retainer adapted to be supported relative to the second member to trap the first member in said receiver, said retainer having an arcuate shaped portion that is adapted to engage the first member, said retainer having a resilient portion that is adapted to conform to a portion of the first member; and a stop that is fixed relative to the first member to prevent the first member from moving laterally relative to said receiver.

11. A pivot joint for supporting a pivotal member relative to a stationary member, said pivot joint comprising:

a receiver supported relative to the stationary member-for receiving the pivotal member, said receiver being at least partially cylindrical; and a retainer adapted to be supported relative to the stationary member to trap the pivotal member in said receiver, said retainer having an arcuate shaped portion that is adapted to engage the pivotal member, said retainer having a resilient portion that is adapted to conform to a portion of the pivotal member, said receiver including a substantially semi-cylindrical sleeve supported by the stationary member, said substantially semi-cylindrical sleeve being at an angle of inclination so as to produce an elevated cylindrical wall portion and a depressed cylindrical wall portion, said pivotal member being adapted to rotate relative to said substantially semi-cylindrical sleeve.

* * * * *